(12) United States Patent
Hu et al.

(10) Patent No.: US 10,083,028 B2
(45) Date of Patent: Sep. 25, 2018

(54) METHOD, APPARATUS AND SYSTEM FOR VERIFYING CODE INTEGRITY ON CLIENTS

(71) Applicant: TENCENT TECHNOLOGY (SHENZHEN) COMPANY LIMITED, Shenzhen, Guangdong (CN)

(72) Inventors: Hejun Hu, Shenzhen (CN); Zhaohui Yin, Shenzhen (CN); Fei Cao, Shenzhen (CN); Zhigang Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 58 days.

(21) Appl. No.: 14/869,607

(22) Filed: Sep. 29, 2015

(65) Prior Publication Data

US 2016/0019058 A1    Jan. 21, 2016

Related U.S. Application Data

(63) Continuation of application No. PCT/CN2014/079772, filed on Jun. 12, 2014.

(30) Foreign Application Priority Data

Jun. 14, 2013  (CN) .................. 2013 1 02361264

(51) Int. Cl.
*G06F 8/71* (2018.01)
*G06F 21/56* (2013.01)
(Continued)

(52) U.S. Cl.
CPC ............... *G06F 8/71* (2013.01); *G06F 21/51* (2013.01); *G06F 21/565* (2013.01);
(Continued)

(58) Field of Classification Search
CPC .......... G06F 8/71; G06F 21/51; G06F 21/565; G06F 51/577; G06F 2221/033; H04L 67/10
See application file for complete search history.

(56) References Cited

U.S. PATENT DOCUMENTS 7,970,820 B1 * 6/2011 Sivasubramanian ... H04L 67/06
709/203
8,285,999 B1 * 10/2012 Ghose .................... G06F 21/54
713/170
(Continued)

FOREIGN PATENT DOCUMENTS

CN     101795293 A     8/2010
CN     102082784 A     6/2011
(Continued)

OTHER PUBLICATIONS

The World Intellectual Property Organization (WIPO) International Search Report for PCT/CN2014/079772 dated Sep. 29, 2014 3 Pages.
(Continued)

*Primary Examiner* — Jacob D Dascomb
(74) *Attorney, Agent, or Firm* — Anova Law Group, PLLC (57) ABSTRACT

A method and apparatus for verifying code integrity on a client, the method comprising: determining a verification object on the client; generating a plurality of verification sequences, wherein each verification sequence comprises a memory access mode, and a verification algorithm; randomly selecting a verification sequence from the plurality of verification sequences, and obtaining a server verification result for the verification object in accordance with the selected verification sequence; sending the selected verification sequence to the client; receiving a client verification result for the verification object calculated by the client in
(Continued)

accordance with the selected verification sequence; and comparing the server verification result with the client verification result to obtain a code verification result.

11 Claims, 5 Drawing Sheets

(51) Int. Cl.
  *G06F 21/51* (2013.01)
  *G06F 21/57* (2013.01)
  *H04L 29/08* (2006.01)

(52) U.S. Cl.
  CPC ............ *G06F 21/577* (2013.01); *H04L 67/10* (2013.01); *G06F 2221/033* (2013.01)

(56) References Cited

U.S. PATENT DOCUMENTS

| | | | |
|---|---|---|---|
| 8,819,827 B1* | 8/2014 | Easttom | G06F 21/565 713/150 |
| 2001/0032290 A1* | 10/2001 | Williams | G06F 12/0638 711/104 |
| 2005/0243798 A1* | 11/2005 | Dunn | H04L 12/2854 370/352 |
| 2009/0245516 A1* | 10/2009 | Ravikiran | H04L 9/0869 380/268 |
| 2010/0077454 A1 | 3/2010 | Xiao et al. | |
| 2012/0047531 A1* | 2/2012 | Eyer | H04N 21/654 725/37 |
| 2013/0139233 A1* | 5/2013 | Maity | H04L 63/08 726/7 |
| 2014/0096246 A1* | 4/2014 | Morrissey | G06F 21/51 726/23 |
| 2014/0150096 A1* | 5/2014 | Moon | G06F 21/645 726/22 |

FOREIGN PATENT DOCUMENTS

| | | |
|---|---|---|
| CN | 102790790 A | 11/2012 |
| CN | 102982258 A | 3/2013 |
| CN | 103345602 A | 10/2013 |
| WO | 2006128876 A2 | 12/2006 |

OTHER PUBLICATIONS

The State Intellectual Property Office of the People's Republic of China (SIPO) Office Action 1 for 201310236126.4 dated Mar. 21, 2014 15 Pages (including translation).

* cited by examiner

METHOD, APPARATUS AND SYSTEM FOR VERIFYING CODE INTEGRITY ON CLIENTS

CROSS-REFERENCE TO RELATED APPLICATIONS

This application is a continuation of International Application No. PCT/CN2014/079772, entitled "Method, Apparatus and System for Verifying Code Integrity on Clients", filed on Jun. 12, 2014. This application claims the benefit and priority of Chinese Patent Application No. 201310236126.4, entitled "Method, Apparatus, and System for Verifying Code Integrity on Clients" filed on Jun. 14, 2013. The entire disclosures of each of the above applications are incorporated herein by reference.

TECHNICAL FIELD

The present invention relates to telecommunication technologies, and more particularly, to method, apparatus and system for verifying code integrity on a client.

BACKGROUND

In client-server applications, the code executed by the client can be easily modified by the user. In order to protect the security of the entire system, the server needs to protect the integrity of the code on the client. To protect the integrity of the code on the client, the server needs to detect whether the code has been modified on the client, which is done through a process called code integrity verification.

In the existing code integrity verification methods, the server typically sends the address and size of the code that needs to be verified to the client; the client reads the data from the memory in accordance with the received address and size of the code, calculates a verification result in accordance with a verification algorithm, and sends the verification result to server; the server then compares the verification results calculated by the client and the server to determine whether the code has been modified.

There are issues in the existing client code integrity verification methods. For example, the hacker can copy the original code, and modify the verification address to the address of the copy, so that the calculated verification result will be the same. The hacker can also intercept the memory access function used to read data from memory, and provide fake data to the memory access function, so that the calculated verification result will be the same. The hacker can also provide the correct verification result directly to the server to circumvent the code integrity verification.

SUMMARY OF THE INVENTION

Embodiments of the present invention provide method, apparatus and system for verifying code integrity on a client, which increases the difficulty of circumventing code integrity verification and enhances the effectiveness of code integrity verification.

In accordance with embodiments of the present invention, a method for verifying code integrity on a client is provided, the method comprising: determining a verification object on the client; generating a plurality of verification sequences, wherein each verification sequence comprises a memory access mode, a verification algorithm, and a packaging format; randomly selecting a verification sequence from the plurality of verification sequences, and obtaining a server verification result for the verification object in accordance with the selected verification sequence; sending the selected verification sequence to the client; receiving a client verification result for the verification object calculated by the client in accordance with the selected verification sequence; and comparing the server verification result with the client verification result to obtain a code verification result.

In accordance with embodiments of the present invention, a method for verifying code integrity on a client is provided, the method comprising: receiving a verification sequence randomly selected from a plurality of verification sequences from a server; determining a memory access mode from X memory access modes, a verification algorithm from Y verification algorithms, and a packaging format from Z packaging formats in accordance with the received verification sequence, wherein X, Y, and Z are integers larger than 1; calculating a client verification result for the verification object in accordance with the memory access mode, the verification algorithm, and the packaging format; and sending the client verification result to the server.

In accordance with embodiments of the present invention, a server for verifying code integrity on a client is provided, comprising: a determining unit for determining a verification object on the client; a generation unit for generating a plurality of verification sequences, wherein each verification sequence comprises a memory access mode, a verification algorithm, and a packaging format; a processing unit for randomly selecting a verification sequence from the plurality of verification sequences, and obtaining a server verification result for the verification object in accordance with the selected verification sequence; a sending unit for sending the selected verification sequence to the client; a receiving unit for receiving a client verification result for the verification object calculated by the client in accordance with the selected verification sequence; and a verification unit for comparing the server verification result with the client verification result to obtain a code verification result.

In accordance with embodiments of the present invention, a client for verifying code integrity is provided, comprising: a receiving unit for receiving a verification sequence randomly selected from a plurality of verification sequences from a server; a determination unit for determining a memory access mode from X memory access modes, a verification algorithm from Y verification algorithms, and a packaging format from Z packaging formats in accordance with the received verification sequence, wherein X, Y, and Z are integers larger than 1; a processing unit for calculating a client verification result for the verification object in accordance with the memory access mode, the verification algorithm, and the packaging format; and a sending unit for sending the client verification result to the server.

In accordance with embodiments of the present invention, a plurality of verification sequences are generated in accordance with a user identifier, wherein each verification sequence comprises a memory access mode, a verification algorithm, and a packaging format; a verification sequence is randomly selected from the plurality of verification sequences; a server verification result for the verification object is calculated in accordance with the selected verification sequence; the selected verification sequence is sent to the client; a client verification result for the verification object calculated by the client in accordance with the selected verification sequence is received from the client; and the server verification result is compared with the client verification result to obtain a client code verification result. As different verification sequences are generated for different user identifiers, the verification sequence is randomly selected for the different verification sequences, and each different verification sequence includes a different memory access mode, a different verification algorithm, and a different packaging format, the difficulty for circumventing the code integrity verification is significantly increased. In addition, as each user identifier can only generate part of the verification options, even if the verification option for a particular client is being circumvented, its effect on the whole system is limited, and the server can simply modify the verification sequences to continue to verify the code integrity on the circumvented clients, which significantly enhances the effectiveness of code integrity verification.

BRIEF DESCRIPTION OF THE DRAWINGS

To better illustrate the technical features of the embodiments of the present invention, various embodiments of the present invention will be briefly described in conjunction with the accompanying drawings. It is obvious that the draws are but for exemplary embodiments of the present invention, and that a person of ordinary skill in the art may derive additional draws without deviating from the principles of the present invention.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

The embodiments of the present invention provide method, apparatus and system for verifying code integrity on a client, and will be described separately below.

This embodiment will be described from the perspective of a server.

A method for verifying code integrity on a client, the method comprising: determining a verification object on the client, and obtaining a user identifier of the client; generating a plurality of verification sequences in accordance with the user identifier, wherein each verification sequence comprises a memory access mode, a verification algorithm, and a packaging format; randomly selecting a verification sequence from the plurality of verification sequences, and calculating a server verification result for the verification object in accordance with the selected verification sequence; sending the selected verification sequence to the client; receiving a client verification result for the verification object calculated by the client in accordance with the selected verification sequence; and comparing the server verification result with the client verification result to obtain a client code verification result: if the server verification result is consistent with the client verification result, the client code verification result is positive; otherwise, the client code verification result is negative.

Figure 1A:
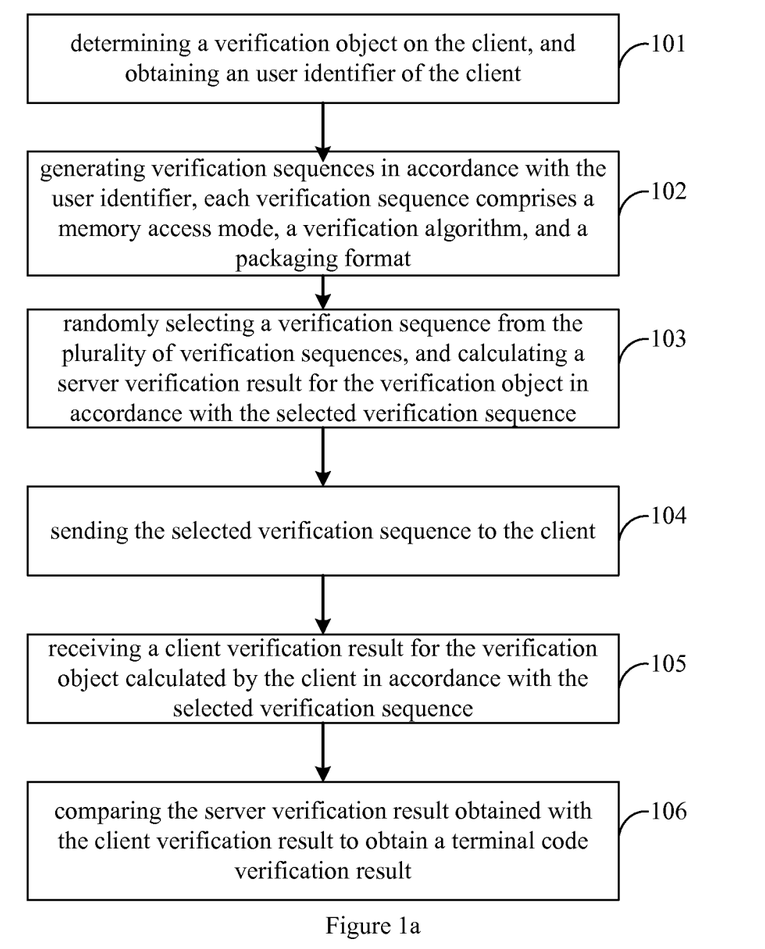
FIG. 1a is an exemplary flowchart for a method for verifying code integrity on a client in accordance with an embodiment of the present invention.

FIG. 1a is an exemplary flowchart for a method for verifying code integrity on a client in accordance with an embodiment of the present invention. As shown in FIG. 1a, the method includes the following steps.

Step 101: determining a verification object on the client, and obtaining a user identifier of the client.

Here, the verification object is the code on the client that needs to be checked for its integrity, such as software executable files, source code, scripts, and configuration files.

Step 102: generating a plurality of verification sequences in accordance with the user identifier obtained in Step 101, wherein each verification sequence comprises a memory access mode, a verification algorithm, and a packaging format.

The client pre-stores X memory access modes, Y verification algorithms, and Z packaging formats, wherein X, Y, and Z are integers larger than 1. The specific values for X, Y, and Z can be set based on system requirement. In another words, in verifying code integrity in accordance with embodiments of the present invention, there are a total of X*Y*Z verification options, and each verification sequence corresponds to a verification option having a specific memory access mode, a specific verification algorithm, and a specific packaging format.

There are a variety of memory access modes, verification algorithms, and packaging formats.

(1) Memory Access Modes

A memory access mode includes the determination of a verification address and a verification size for the verification object, and a memory access function.

The verification address needs to overlap with the actual address of the verification object. For example, if the address of the verification object is (X, Y), then the verification address can be (X−a, Y+b), where 0<a<X, and 0<b<MaxAdd−Y.

Figure 1B:
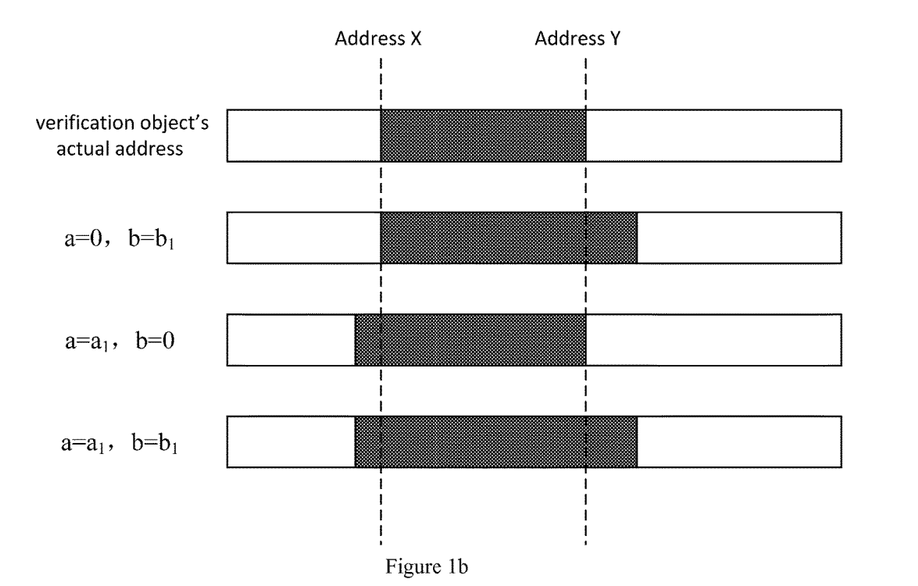
FIG. 1b is an exemplary schematic diagram illustrating verification addresses in accordance with an embodiment of the present invention.

If the address of the verification object is (X, Y), data stored in memory at (X, Y) needs to be checked. For one user, a can be 0 and b can be a positive value b1, so the address on the client that will be checked will be (X, Y+b1). For another user, a can be a positive value a1, and b can be 0, so that the address on the client that will be checked will be (X−a, Y). For yet another user, a can be a positive value a1 and b can be a positive value b1, so that the address on the client that will be checked will be (X−a1, Y+b1). FIG. 1b is an exemplary schematic diagram illustrating verification addresses in accordance with an embodiment of the present invention. As shown in FIG. 1b, the verification address can be chosen differently, as far as it overlaps with the actual address of the verification object.

Similarly, there are many different memory access functions can be used to read data from memory, such as memmove( ), memcpy( ), ReadProcessMemory( ) or ZwReadVirtualMemory( ). In addition, based on the need, new memory access functions can be written to read data from memory, such as reading one character a time in order, reading one character a time in reverse order, reading two characters a time in order, reading two characters a time in reverse order, reading four characters a time in order, reading four characters a time in reverse order, or reading every other character. Furthermore, drivers can be written to call core functions to read data from memory reserved for a particular process.

It should be noted that, one memory access function can be used to read data from the memory, or a number of memory access functions can be used to read data from different part of the memory, and the different memory access functions and the combination thereof can be used for different memory access mode.

(2) Verification Algorithm

The data from memory can be calculated in accordance with the verification algorithm to obtain a calculation result. The verification algorithm needs to ensure the consistency of the calculation result, i.e., the same data will derive the same calculation result.

For example, the verification algorithm can be any of the following: CRC32, CRC16, MD5, SHA160, SHA256, SHA384, SHA512, HAVAL128, HAVAL160, HAVAL192, HAVAL224, HAVAL256, RIPEMD160.

In addition, the verification algorithm can also process data in the memory according to the need, such as: NOR four characters by four characters; ADD character by character; ADD characters in odd positions; NOR or ADD characters in even positions with characters in odd positions.

(3) Packaging Format

Since the server may send multiple verification sequences for multiple verification objects, the client need to send such information back to the server along with the client verification result so that the server will compare that with the appropriate server verification result. The data package that the client sends to the server needs to include at least the following data items: the verification address, the verification size, the client verification result, the memory access mode, the verification algorithm, and the packaging format.

Here, the packaging format can be the order of data items in the data package. In another words, the packaging format can be any combination of these six parameters, such as "the verification address, the verification size, the client verification result, the memory access mode, the verification algorithm, and the packaging format", "the verification size, the verification address, the client verification result, the memory access mode, the verification algorithm, and the packaging format", or "the client verification result, the verification size, the verification address, the memory access mode, the verification algorithm, and the packaging format."

Optionally, a number of superfluous data items can be added to the data package to further complicate the combination. In another word, the data package can further include n superfluous data items having no apparent meanings, where n is an integer; and the packaging format can be any combination of (6+n) parameters.

Step 103: randomly selecting a verification sequence from the plurality of verification sequences, and calculating a server verification result for the verification object in accordance with the selected verification sequence.

Here, a random number can be generated from the user identifier of the client, an Media Access Control (MAC) address of the user, an Internet Protocol (IP) address of the user, a registration time of the user, or a login time of the user, and the step of randomly selecting a verification sequence from the plurality of verification sequences can include generating a random number from the user identifier of the client, an MAC address of the user, an IP address of the user, a registration time of the user, or a login time of the user; and randomly selecting a verification sequence from the plurality of verification sequences in accordance with the random number.

Here, the step of calculating a server verification result for the verification object in accordance with the selected verification sequence can including the following steps: (1) determining a memory access mode, a verification algorithm, and a packaging format in accordance with the selected verification sequence; (2) reading data for the verification object from memory in accordance with the memory access mode; (3) calculating a server verification value using the data in accordance with the verification algorithm; and (4) packaging the server verification value in accordance with the packaging format to obtain the server verification result. The step of reading data for the verification object from memory in accordance with the memory access mode further includes: determining a verification address and a verification size for the verification object in accordance with the memory access mode, wherein the verification address overlaps with the address of the verification object (see Step 102 for more detailed description); determining a memory access function from a preset list of memory access functions in accordance with the memory access mode; and reading data for the verification object from memory in accordance with the verification address, the verification size, and the memory access function.

Alternatively, the server verification result can be obtained from a verification result database in accordance with the selected verification sequence. The data in the verification result database may be obtained from a server or a verified client.

Step 104: sending the selected verification sequence to the client.

Here, Step 104 can be performed either before or after the step of calculating a server verification result for the verification object in accordance with the selected verification sequence in Step 103.

Step 105: receiving a client verification result for the verification object calculated by the client in accordance with the selected verification sequence.

The client can obtain the client verification results in the following steps:

(1) determining a memory access mode from X memory access modes pre-stored on the client, a verification algorithm from Y verification algorithms pre-stored on the client, and a packaging format from Z packaging formats pre-stored on the client in accordance with the received verification sequence, wherein X, Y, and Z are integers larger than 1.

(2) calculating a client verification result for the verification object in accordance with the memory access mode, the verification algorithm, and the packaging format, such as reading data for the verification object from memory in accordance with the memory access mode; calculating a client verification value using the data in accordance with the verification algorithm; packaging the client verification value in accordance with the packaging format to obtain the client verification result.

Here, the step of reading data for the verification object from memory in accordance with the memory access mode can include: determining a verification address and a verification size for the verification object in accordance with the memory access mode, wherein the verification address overlaps with the address of the verification object; determining a memory access function from a preset list of memory access functions in accordance with the memory access mode; and reading data for the verification object from memory in accordance with the verification address, the verification size, and the memory access function.

Step 106: comparing the server verification result obtained in Step 104 with the client verification result obtained in Step 105 to obtain a client code verification result: if the server verification result is consistent with the client verification result, the client code verification result is positive; otherwise, the client code verification result is negative.

In this embodiment, a plurality of verification sequences are generated in accordance with a user identifier, wherein each verification sequence comprises a memory access mode, a verification algorithm, and a packaging format; a verification sequence is randomly selected from the plurality of verification sequences; a server verification result for the verification object is calculated in accordance with the selected verification sequence; the selected verification sequence is sent to the client; a client verification result for the verification object calculated by the client in accordance with the selected verification sequence is received from the client; and the server verification result is compared with the client verification result to obtain a client code verification result. As different verification sequences are generated for different user identifiers, the verification sequence is randomly selected for the different verification sequences, and each different verification sequence includes a different memory access mode, a different verification algorithm, and a different packaging format, the difficulty for circumventing the code integrity verification is significantly increased. In addition, as each user identifier can only generate part of the verification options, even if the verification option for a particular client is being circumvented, its effect on the whole system is limited, and the server can simply modify the verification sequences to continue to verify the code integrity on the circumvented clients, which significantly enhances the effectiveness of code integrity verification.

This embodiment will be described from the perspective of a client. In the following discussion, the term "client" may refer to, a client terminal device, which includes but is not limited to, a desktop computer, a laptop, a netbook, a tablet, a mobile phone, a multimedia TV and other electronic equipment, or a client side application program.

A method for verifying code integrity on a client, the method comprising: receiving a verification sequence randomly selected from a plurality of verification sequences from a server, where the plurality of verification sequences are generated in accordance with a user identifier of a client, and each verification sequence comprises a memory access mode, a verification algorithm, and a packaging format; determining a memory access mode from X memory access modes pre-stored on the client, a verification algorithm from Y verification algorithms pre-stored on the client, and a packaging format from Z packaging formats pre-stored on the client in accordance with the received verification sequence, wherein X, Y, and Z are integers larger than 1; calculating a client verification result for the verification object in accordance with the memory access mode, the verification algorithm, and the packaging format; and sending the client verification result to the server for comparison with a server verification result for the verification object to obtain a code verification result, wherein the server verification result is calculated in accordance with the selected verification sequence.

Figure 2:
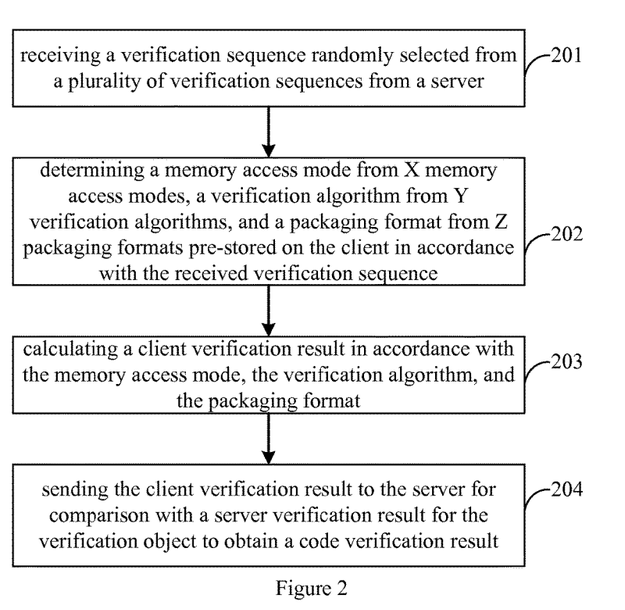
FIG. 2 is an exemplary flowchart for a method for verifying code integrity on a client in accordance with another embodiment of the present invention.

FIG. 2 is an exemplary flowchart for a method for verifying code integrity on a client in accordance with another embodiment of the present invention. As shown in FIG. 2, the method includes the following steps.

Step 201: receiving a verification sequence randomly selected from a plurality of verification sequences from a server.

Here, the plurality of verification sequences are generated in accordance with a user identifier of a client, and each verification sequence comprises a memory access mode, a verification algorithm, and a packaging format.

There are a variety of memory access modes, verification algorithms, and packaging formats.

(1) Memory Access Modes

A memory access mode includes the determination of a verification address and a verification size for the verification object, and a memory access function.

The verification address needs to overlap with the actual address of the verification object. For example, if the address of the verification object is (X, Y), then the verification address can be (X−a, Y+b), where 0<a<X, and 0<b<MaxAdd−Y.

Similarly, there are many different memory access functions can be used to read data from memory, such as memmove( ), memcpy( ), ReadProcessMemory( ) or ZwReadVirtualMemory( ). In addition, based on the need, new memory access functions can be written to read data from memory, such as reading one character a time in order, reading one character a time in reverse order, reading two characters a time in order, reading two characters a time in reverse order, reading four characters a time in order, reading four characters a time in reverse order, or reading every other character. Furthermore, drivers can be written to call core functions to read data from memory reserved for a particular process.

It should be noted that, one memory access function can be used to read data from the memory, or a number of memory access functions can be used to read data from different part of the memory, and the different memory access functions and the combination thereof can be used for different memory access mode.

(2) Verification Algorithm

The data from memory can be calculated in accordance with the verification algorithm to obtain a calculation result. The verification algorithm needs to ensure the consistency of the calculation result, i.e., the same data will derive the same calculation result.

For example, the verification algorithm can be any of the following: CRC32, CRC16, MD5, SHA160, SHA256, SHA384, SHA512, HAVAL128, HAVAL160, HAVAL192, HAVAL224, HAVAL256, RIPEMD160.

In addition, the verification algorithm can also process data in the memory according to the need, such as: NOR four characters by four characters; ADD character by character; ADD characters in odd positions; NOR or ADD characters in even positions with characters in odd positions.

(3) Packaging Format

Since the server may send multiple verification sequences for multiple verification objects, the client need to send such information back to the server along with the client verification result so that the server will compare that with the appropriate server verification result. The data package that the client sends to the server needs to include at least the following data items: the verification address, the verification size, the client verification result, the memory access mode, the verification algorithm, and the packaging format.

Here, the packaging format can be the order of data items in the data package. In another words, the packaging format can be any combination of these six parameters, such as "the verification address, the verification size, the client verification result, the memory access mode, the verification algorithm, and the packaging format", "the verification size, the verification address, the client verification result, the memory access mode, the verification algorithm, and the packaging format", or "the client verification result, the verification size, the verification address, the memory access mode, the verification algorithm, and the packaging format."

Optionally, a number of superfluous data items can be added to the data package to further complicate the combination. In another word, the data package can further include n superfluous data items having no apparent meanings, where n is an integer; and the packaging format can be any combination of (6+n) parameters.

Step 202: determining a memory access mode from X memory access modes pre-stored on the client, a verification algorithm from Y verification algorithms pre-stored on the client, and a packaging format from Z packaging formats pre-stored on the client in accordance with the received verification sequence.

Here, X, Y, and Z are integers larger than 1, and can be set based on need.

Step 203: calculating a client verification result for the verification object in accordance with the memory access mode, the verification algorithm, and the packaging format.

Here, Step 203 can include reading data for the verification object from memory in accordance with the memory access mode; calculating a client verification value using the data in accordance with the verification algorithm; packaging the client verification value in accordance with the packaging format to obtain the client verification result.

Here, the step of reading data for the verification object from memory in accordance with the memory access mode can include: determining a verification address and a verification size for the verification object in accordance with the memory access mode, wherein the verification address overlaps with the address of the verification object; determining a memory access function from a preset list of memory access functions in accordance with the memory access mode; and reading data for the verification object from memory in accordance with the verification address, the verification size, and the memory access function.

Step 204: sending the client verification result to the server for comparison with a server verification result for the verification object to obtain a code verification result, wherein the server verification result is calculated in accordance with the selected verification sequence.

Here, the server verification result is calculated by the server in accordance with the selected verification sequence, or obtained from a verification result database. The embodiment above can be referenced for the implementation details of Step 204, which will not be repeated here.

In this embodiment, a verification sequence randomly selected from a plurality of verification sequences is received from a server, where the plurality of verification sequences are generated in accordance with a user identifier of a client, and each verification sequence comprises a memory access mode, a verification algorithm, and a packaging format; a client verification result for the verification object is calculated in accordance with the verification sequence, and sent to the server for comparison with a server verification result for the verification object to obtain a code verification result, wherein the server verification result is calculated in accordance with the selected verification sequence. As different verification sequences are generated for different user identifiers, the verification sequence is randomly selected for the different verification sequences, and each different verification sequence includes a different memory access mode, a different verification algorithm, and a different packaging format, the difficulty for circumventing the code integrity verification is significantly increased. In addition, as each user identifier can only generate part of the verification options, even if the verification option for a particular client is being circumvented, its effect on the whole system is limited, and the server can simply modify the verification sequences to continue to verify the code integrity on the circumvented clients, which significantly enhances the effectiveness of code integrity verification.

The above embodiments will be further descripted in connection with the following example.

Figure 3:
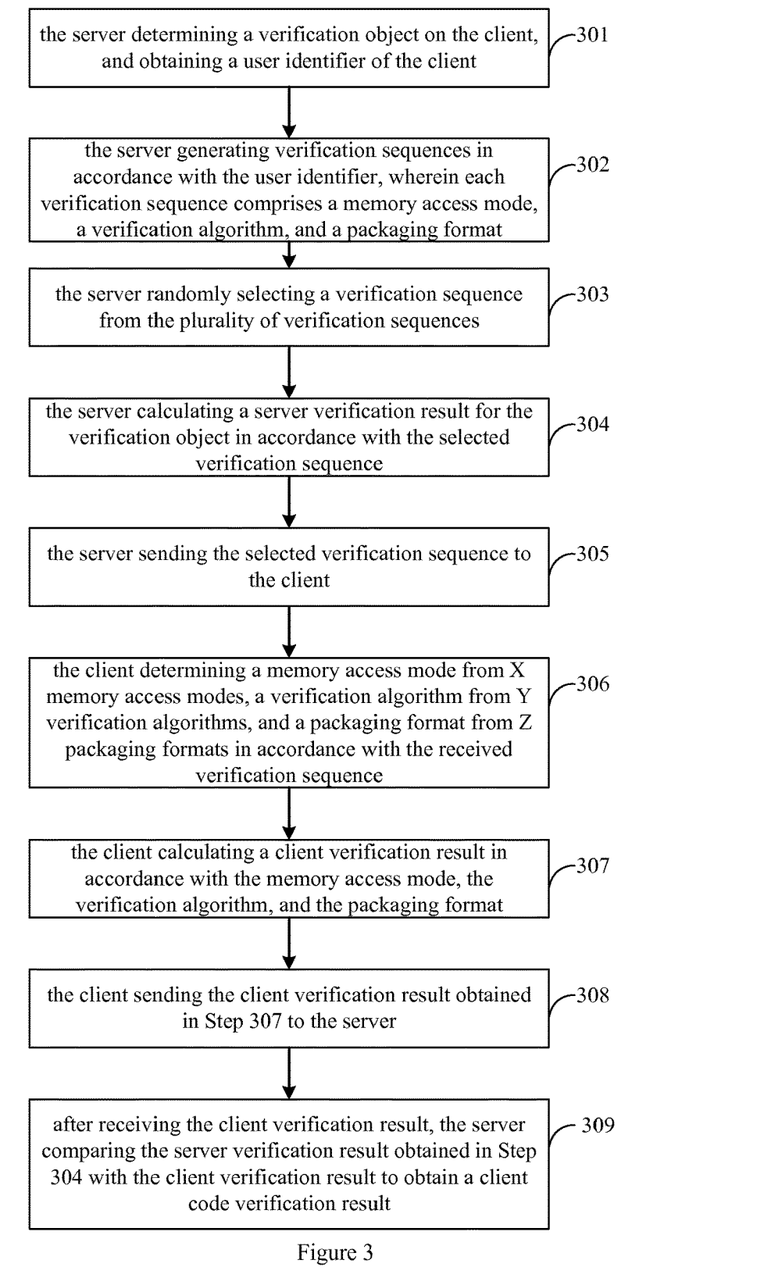
FIG. 3 is an exemplary flowchart for a method for verifying code integrity on a client in accordance with yet another embodiment of the present invention.

FIG. 3 is an exemplary flowchart for a method for verifying code integrity on a client in accordance with yet another embodiment of the present invention. As shown in FIG. 3, the method includes the following steps.

Step 301: the server determining a verification object on the client, and obtaining a user identifier of a client.

Here, the verification object is the code on the client that needs to be checked for its integrity.

Step 302: the server generating a plurality of verification sequences in accordance with the user identifier obtained in Step 301, wherein each verification sequence comprises a memory access mode, a verification algorithm, and a packaging format.

The client pre-stores X memory access modes, Y verification algorithms, and Z packaging formats, wherein X, Y, and Z are integers larger than 1. The specific values for X, Y, and Z can be set based on system requirement. In another words, in verifying code integrity in accordance with embodiments of the present invention, there are a total of X*Y*Z verification options, and each verification sequence corresponds to a verification option having a specific memory access mode, a specific verification algorithm, and a specific packaging format. For example, Table 1 below list the X memory access modes, Y verification algorithms, and Z packaging formats pre-stored on the client; while Table 2 illustrates the relationship between the verification sequences and the X memory access modes, Y verification algorithms, and Z packaging formats.

TABLE 1

| Memory Access Mode 1 | Verification Algorithm 1 | Packaging Format 1 |
| Memory Access Mode 2 | Verification Algorithm 2 | Packaging Format 2 |
| Memory Access Mode 3 | Verification Algorithm 3 | Packaging Format 3 |
| ... | ... | ... |
| Memory Access Mode X | Verification Algorithm Y | Packaging Format Z |

TABLE 2

| Verification Sequence 1 | Memory Access Mode $X_1$ | Verification Algorithm $Y_1$ | Packaging Format $Z_1$ |
| Verification Sequence 2 | Memory Access Mode $X_2$ | Verification Algorithm $Y_2$ | Packaging Format $Z_2$ |
| Verification Sequence 3 | Memory Access Mode $X_3$ | Verification Algorithm $Y_3$ | Packaging Format $Z_3$ |
| ... | ... | ... | ... |
| Verification Sequence K | Memory Access Mode $X_K$ | Verification Algorithm $Y_K$ | Packaging Format $Z_K$ |

There are a variety of memory access modes, verification algorithms, and packaging formats.

Step 303: the server randomly selecting a verification sequence from the plurality of verification sequences.

Here, a random number can be generated from the user identifier of the client, an Media Access Control (MAC)

address of the user, an Internet Protocol (IP) address of the user, a registration time of the user, or a login time of the user; and a verification sequence can be randomly selected from the plurality of verification sequences in accordance with the random number.

Step 304: the server calculating a server verification result for the verification object in accordance with the selected verification sequence in Step 303.

Here, Step 304 can including the following steps: (1) determining a memory access mode, a verification algorithm, and a packaging format in accordance with the selected verification sequence; (2) reading data for the verification object from memory in accordance with the memory access mode; (3) calculating a server verification value using the data in accordance with the verification algorithm; and (4) packaging the server verification value in accordance with the packaging format to obtain the server verification result. The step of reading data for the verification object from memory in accordance with the memory access mode further includes: determining a verification address and a verification size for the verification object in accordance with the memory access mode, wherein the verification address overlaps with the address of the verification object (see Step 102 for more detailed description); determining a memory access function from a preset list of memory access functions in accordance with the memory access mode; and reading data for the verification object from memory in accordance with the verification address, the verification size, and the memory access function.

Alternatively, the server verification result can be obtained from a verification result database in accordance with the selected verification sequence. The data in the verification result database may be obtained from a server or a verified client.

Step 305: the server sending the selected verification sequence in step 304 to the client.

Here, Steps 305 can be performed either before or after Step 304.

Step 306: the client determining a memory access mode from X memory access modes pre-stored on the client, a verification algorithm from Y verification algorithms pre-stored on the client, and a packaging format from Z packaging formats pre-stored on the client in accordance with the received verification sequence, wherein X, Y, and Z are integers larger than 1.

Step 307: the client calculating a client verification result for the verification object in accordance with the memory access mode, the verification algorithm, and the packaging format.

Here, Step 307 can include reading data for the verification object from memory in accordance with the memory access mode; calculating a client verification value using the data in accordance with the verification algorithm; packaging the client verification value in accordance with the packaging format to obtain the client verification result.

Here, the step of reading data for the verification object from memory in accordance with the memory access mode can include: determining a verification address and a verification size for the verification object in accordance with the memory access mode, wherein the verification address overlaps with the address of the verification object; determining a memory access function from a preset list of memory access functions in accordance with the memory access mode; and reading data for the verification object from memory in accordance with the verification address, the verification size, and the memory access function.

Step 308: the client sending the client verification result obtained in Step 307 to the server.

Step 309: after receiving the client verification result, the server comparing the server verification result obtained in Step 304 with the client verification result to obtain a client code verification result: if the server verification result is consistent with the client verification result, the client code verification result is positive; otherwise, the client code verification result is negative.

Here, the packaging format can be used to match the client verification result with the appropriate server verification result.

In this embodiment, a plurality of verification sequences are generated in accordance with a user identifier, wherein each verification sequence comprises a memory access mode, a verification algorithm, and a packaging format; a verification sequence is randomly selected from the plurality of verification sequences; a server verification result for the verification object is calculated in accordance with the selected verification sequence; the selected verification sequence is sent to the client; a client verification result for the verification object calculated by the client in accordance with the selected verification sequence is received from the client; and the server verification result is compared with the client verification result to obtain a client code verification result. As different verification sequences are generated for different user identifiers, the verification sequence is randomly selected for the different verification sequences, and each different verification sequence includes a different memory access mode, a different verification algorithm, and a different packaging format, the difficulty for circumventing the code integrity verification is significantly increased. In addition, as each user identifier can only generate part of the verification options, even if the verification option for a particular client is being circumvented, its effect on the whole system is limited, and the server can simply modify the verification sequences to continue to verify the code integrity on the circumvented clients, which significantly enhances the effectiveness of code integrity verification.

Figure 4:
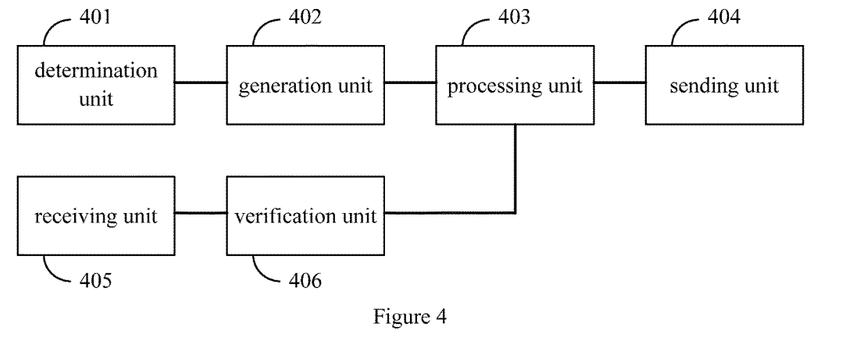
FIG. 4 is an exemplary schematic diagram for a server for verifying code integrity on a client in accordance with an embodiment of the present invention.

FIG. 4 is an exemplary schematic diagram for a server for verifying code integrity on a client in accordance with an embodiment of the present invention. As shown in FIG. 4, the server includes a determination unit 401, a generation unit 402, a processing unit 403, a sending unit 404, a receiving unit 405 and a verification unit 406.

The determination unit 401 is used for determining a verification object on the client, and obtaining a user identifier of a client.

The generation unit 402 is used for generating a plurality of verification sequences in accordance with the user identifier, wherein each verification sequence comprises a memory access mode, a verification algorithm, and a packaging format.

The client pre-stores X memory access modes, Y verification algorithms, and Z packaging formats, wherein X, Y, and Z are integers larger than 1. The specific values for X, Y, and Z can be set based on system requirement. In another words, in verifying code integrity in accordance with embodiments of the present invention, there are a total of X*Y*Z verification options, and each verification sequence corresponds to a verification option having a specific memory access mode, a specific verification algorithm, and a specific packaging format.

There are a variety of memory access modes, verification algorithms, and packaging formats.

The processing unit 403 is used for randomly selecting a verification sequence from the plurality of verification sequences, and calculating a server verification result for the verification object in accordance with the selected verification sequence.

The sending unit 404 is used for sending the selected verification sequence to the client.

The receiving unit 405 is used for receiving a client verification result for the verification object calculated in accordance with the selected verification sequence by the client.

The verification unit 406 is used for comparing the server verification result with the client verification result to obtain a client code verification result: if the server verification result is consistent with the client verification result, the client code verification result is positive; otherwise, the client code verification result is negative.

The processing unit 403 can include a selection subunit, a determination subunit, a reading subunit, a calculating subunit and a packaging subunit.

The selection subunit is used for randomly selecting a verification sequence from the plurality of verification sequences.

The determination subunit is used for determining a memory access mode, a verification algorithm, and a packaging format in accordance with the selected verification sequence.

The reading subunit is used for reading data for the verification object from memory in accordance with the memory access mode.

The calculating subunit is used for calculating a server verification value using the data in accordance with the verification algorithm.

The packaging subunit is used for packaging the server verification value in accordance with the packaging format to obtain the server verification result.

The reading subunit is further used for determining a verification address and a verification size for the verification object in accordance with the memory access mode, wherein the verification address overlaps with the address of the verification object (see Step 102 for more detailed description); determining a memory access function from a preset list of memory access functions in accordance with the memory access mode; and reading data for the verification object from memory in accordance with the verification address, the verification size, and the memory access function.

Here, a random number can be generated from the user identifier of the client, an Media Access Control (MAC) address of the user, an Internet Protocol (IP) address of the user, a registration time of the user, or a login time of the user and the processing unit 403 is further used for generating a random number from the user identifier, an MAC address of the user, an IP address of the user, a registration time of the user, or a login time of the user; and randomly selecting a verification sequence from the plurality of verification sequences in accordance with the random number.

The various units and subunits can be implemented as separate entities, or be combined as one or more entities, and the descriptions in the previous embodiments can be referenced for their implementation details.

In this embodiment, a plurality of verification sequences are generated by the generation unit 402 in accordance with a user identifier, wherein each verification sequence comprises a memory access mode, a verification algorithm, and a packaging format; a verification sequence is randomly selected from the plurality of verification sequences by the processing unit 403; a server verification result for the verification object is calculated in accordance with the selected verification sequence; the selected verification sequence is sent to the client by the sending unit 404; a client verification result for the verification object calculated by the client in accordance with the selected verification sequence is received from the client by the receiving unit 405; and the server verification result is compared with the client verification result to obtain a client code verification result by the verification unit 406. As different verification sequences are generated for different user identifiers, the verification sequence is randomly selected for the different verification sequences, and each different verification sequence includes a different memory access mode, a different verification algorithm, and a different packaging format, the difficulty for circumventing the code integrity verification is significantly increased. In addition, as each user identifier can only generate part of the verification options, even if the verification option for a particular client is being circumvented, its effect on the whole system is limited, and the server can simply modify the verification sequences to continue to verify the code integrity on the circumvented clients, which significantly enhances the effectiveness of code integrity verification.

Figure 5:
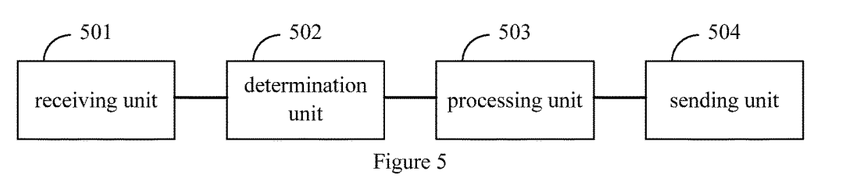
FIG. 5 is an exemplary schematic diagram for a client for verifying code integrity on a client in accordance with an embodiment of the present invention.

FIG. 5 is an exemplary schematic diagram for a client for verifying code integrity on a client in accordance with an embodiment of the present invention. As shown in FIG. 5, the client includes a receiving unit 501, a determination unit 502, a processing unit 503, and a sending unit 504.

The receiving unit 501 is used for receiving a verification sequence randomly selected from a plurality of verification sequences from a server.

Here, the plurality of verification sequences are generated in accordance with a user identifier of a client, and each verification sequence comprises a memory access mode, a verification algorithm, and a packaging format.

There are a variety of memory access modes, verification algorithms, and packaging formats.

The determination unit 502 is used for determining a memory access mode from X memory access modes pre-stored on the client, a verification algorithm from Y verification algorithms pre-stored on the client, and a packaging format from Z packaging formats pre-stored on the client in accordance with the received verification sequence.

Here, X, Y, and Z are integers larger than 1, and can be set based on needs.

The processing unit 503 is used for calculating a client verification result for the verification object in accordance with the memory access mode, the verification algorithm, and the packaging format.

The sending unit 504 is used for sending the client verification result to the server for comparison with a server verification result for the verification object to obtain a code verification result.

Here, the server verification result is calculated in accordance with the selected verification sequence.

The processing unit 503 can include a reading subunit, a calculating subunit, and a packaging subunit.

The reading subunit can be used for reading data for the verification object from memory in accordance with the memory access mode.

The calculating subunit can be used for calculating a client verification value using the data in accordance with the verification algorithm.

The packaging subunit can be used for packaging the client verification value in accordance with the packaging format to obtain the client verification result.

Here, the reading subunit can be used for determining a verification address and a verification size for the verification object in accordance with the memory access mode, wherein the verification address overlaps with the address of the verification object; determining a memory access function from a preset list of memory access functions in accordance with the memory access mode; and reading data for the verification object from memory in accordance with the verification address, the verification size, and the memory access function.

The various units and subunits can be implemented as separate entities, or be combined as one or more entities, and the descriptions in the previous embodiments can be referenced for their implementation details.

In this embodiment, a verification sequence randomly selected from a plurality of verification sequences is received from a server by the receiving unit 501, where the plurality of verification sequences are generated in accordance with a user identifier of a client, and each verification sequence comprises a memory access mode, a verification algorithm, and a packaging format; a client verification result for the verification object is calculated by the determination unit 502 and the processing unit 503 in accordance with the verification sequence, and sent to the server by the sending unit 504 for comparison with a server verification result for the verification object to obtain a code verification result, wherein the server verification result is calculated in accordance with the selected verification sequence. As different verification sequences are generated for different user identifiers, the verification sequence is randomly selected for the different verification sequences, and each different verification sequence includes a different memory access mode, a different verification algorithm, and a different packaging format, the difficulty for circumventing the code integrity verification is significantly increased. In addition, as each user identifier can only generate part of the verification options, even if the verification option for a particular client is being circumvented, its effect on the whole system is limited, and the server can simply modify the verification sequences to continue to verify the code integrity on the circumvented clients, which significantly enhances the effectiveness of code integrity verification.

In another embodiment, a telecommunication system is provided, which includes a server and a client in accordance with the above embodiments.

Figure 6:
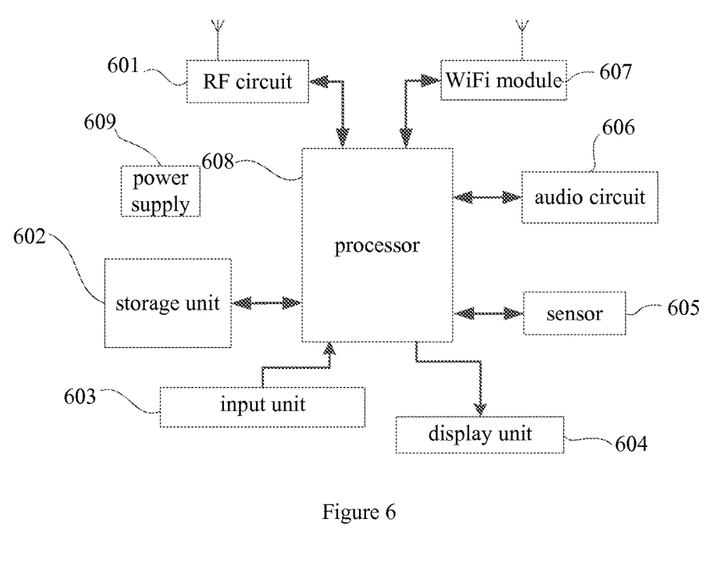
FIG. 6 is an exemplary schematic diagram for a client for verifying code integrity on a client in accordance with another embodiment of the present invention.

FIG. 6 is an exemplary schematic diagram for a client for verifying code integrity on a client in accordance with another embodiment of the present invention. As shown in FIG. 6, the client includes an RF circuit 601, one or more computer-readable storage medium or storage unit 602, an input unit 603, a display unit 604, a sensor 605, an audio circuit 606, a WiFi module 607, a processor 608, and a power supply 609. Those skilled in the art will understand that the client could include more or less components that those illustrated in FIG. 6.

The RF circuit 601 can be used to send and receive signals to the processor 280 or a base station during data transmission and/or audio communication.

The storage unit 602 can be used to store software programs and modules, which can be executed by the processor 608 to perform a variety of functions and data processing.

The input unit 603 can be used to receive the input of numeric or character information, or to receive signal from system input or control devices such as keyboard, mouse, joystick, or optical trackball.

The display unit 604 can be used to display information entered by a user or provided to the users on a graphical user interface, which can include graphs, texts, icons, videos, and the combination thereof.

The client may also include at least one sensor 605, such as a light sensor, a motion sensor or other sensors.

The audio circuit 606 provides the client with an audio interface, and can be used to process audio data.

The WiFi module 607 can be used to establish a WiFi connection for the client, which is a wireless connection for providing Internet access over a short distance.

The processor 608 is the control center of the client. The processor 608 is connected to the various components of the electronic devices through various interface and wires, and executes the software programs and modules stored in storage unit 602 to perform a variety of functions and data processing.

The client also includes a power source 609, such as a battery.

Specifically, the storage unit 602 stores software programs and modules that correspond to the client for verifying code integrity in accordance with the embodiments of the present invention, and the processor 608 executes the software programs and modules to perform the methods for verifying code integrity in accordance with the embodiments of the present invention.

Figure 7:
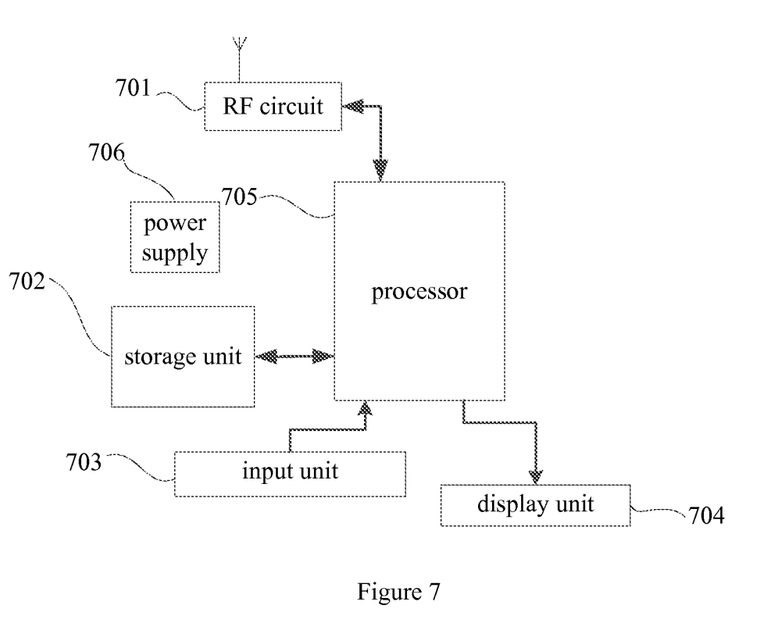
FIG. 7 is an exemplary schematic diagram for a server for verifying code integrity on a client in accordance with another embodiment of the present invention.

FIG. 7 is an exemplary schematic diagram for a server for verifying code integrity on a client in accordance with another embodiment of the present invention. As shown in FIG. 6, the server includes an RF circuit 701, one or more computer-readable storage medium or storage unit 702, an input unit 703, a display unit 704, a processor 705, and a power supply 706. Those skilled in the art will understand that the client could include more or less components that those illustrated in FIG. 7.

The RF circuit 701 can be used to send and receive signals to the processor 705 or a base station during data transmission and/or audio communication.

The storage unit 702 can be used to store software programs and modules, which can be executed by the processor 705 to perform a variety of functions and data processing.

The input unit 703 can be used to receive the input of numeric or character information, or to receive signal from system input or control devices such as keyboard, mouse, joystick, or optical trackball.

The display unit 704 can be used to display information entered by a user or provided to the users on a graphical user interface, which can include graphs, texts, icons, videos, and the combination thereof.

The processor 705 is the control center of the server. The processor 608 is connected to the various components of the electronic devices through various interface and wires, and executes the software programs and modules stored in storage unit 702 to perform a variety of functions and data processing.

The server also includes a power source 706, such as a battery.

Specifically, the storage unit 702 stores software programs and modules that correspond to the server for verifying code integrity in accordance with the embodiments of the present invention, and the processor 705 executes the software programs and modules to perform the methods for verifying code integrity in accordance with the embodiments of the present invention.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for verifying code integrity on a client, the method comprising:
    determining a verification object on the client;
    generating a plurality of verification sequences, wherein each verification sequence comprises a memory access mode, and a verification algorithm;
    randomly selecting a verification sequence from the plurality of verification sequences, and obtaining a server verification result for the verification object based on the selected verification sequence;
    sending the selected verification sequence to the client;
    receiving a client verification result for the verification object calculated by the client based on the selected verification sequence; and
    comparing the server verification result with the client verification result to obtain a code verification result,
    wherein the step of obtaining a server verification result comprises:
        determining a memory access mode, a verification algorithm, and a packaging format based on the selected verification sequence,
        reading data for the verification object from memory based on the memory access mode of the selected verification sequence;
        calculating a server verification value using the data based on the verification algorithm of the selected verification sequence; and
        packaging the server verification value based on the packaging format to obtain the server verification result,
    wherein the step of reading data for the verification object from memory based on the memory access mode comprises:
        determining the verification address and the verification size for the verification object based on the memory access mode, wherein the verification address overlaps with the address of the verification object;
        determining a memory access function from a preset list of memory access functions based on the memory access mode; and
        reading data for the verification object from memory based on the verification address, the verification size, and the memory access function,
    wherein the packaging format comprises an order of a plurality of data items, wherein the plurality of data items comprise a verification address, a verification size, the client verification result, the memory access mode, the verification algorithm, and the packaging format.

2. The method of claim 1, further comprising obtaining a user identifier of the client, and wherein the step of generating a plurality of verification sequences comprises generating a plurality of verification sequences based on the obtained user identifier.

3. The method of claim 1, wherein the plurality of data items comprise a superfluous data item.

4. The method of claim 1, wherein the step of randomly selecting a verification sequence from the plurality of verification sequences comprises:
    generating a random number from a data item selected from a group consisting of a user identifier of a client, an MAC address of the user, an IP address of the user, a registration time of the user, and a login time of the user; and
    randomly selecting a verification sequence from the plurality of verification sequences based on the random number.

5. A server for verifying code integrity on a client, comprising:
    a memory;
    a processor coupled to the memory;
    program units stored in the memory to be executed by the processor, the program units comprising:
    a determination unit for determining a verification object on the client;
    a generation unit for generating a plurality of verification sequences, wherein each verification sequence comprises a memory access mode, and a verification algorithm;
    a processing unit for randomly selecting a verification sequence from the plurality of verification sequences, and obtaining a server verification result for the verification object based on the selected verification sequence;
    a sending unit for sending the selected verification sequence to the client;
    a receiving unit for receiving a client verification result for the verification object calculated by the client based on the selected verification sequence; and
    a verification unit for comparing the server verification result with the client verification result to obtain a code verification result, wherein the processing unit comprises:
  a determination subunit for determining a memory access mode, a verification algorithm, and a packaging format based on the selected verification sequences;
  a reading subunit for reading data for the verification object from memory based on the memory access mode of the selected verification sequence;
  a calculating subunit for calculating a server verification value using the data based on the verification algorithm of the selected verification sequence; and
  a packaging subunit for packaging the server verification value based on the packaging format to obtain the server verification result,
wherein the reading subunit is further configured for:
  determining the verification address and the verification size for the verification object based on the memory access mode of the selected verification sequence, wherein the verification address overlaps with the address of the verification object;
  determining a memory access function from a preset list of memory access functions based on the memory access mode of the selected verification sequence; and
  reading data for the verification object from memory based on the verification address, the verification size, and the memory access function,
wherein the packaging format comprises an order of a plurality of data items, wherein the plurality of data items comprise a verification address, a verification size, the client verification result, the memory access mode, the verification algorithm, and the packaging format.

6. The server of claim 5, wherein the determination unit is further configured for obtaining a user identifier of a client, and the generation unit is further configured for generating a plurality of verification sequences based on the obtained user identifier of the client.

7. The server of claim 5, wherein the processing unit is further configured for:
  generating a random number from a data item selected from a group consisting of a user identifier of a client, an MAC address of the user, an IP address of the user, a registration time of the user, and a login time of the user; and
  randomly selecting a verification sequence from the plurality of verification sequences based on the random number.

8. A non-transitory computer-readable storage medium storing computer-executable program that, when being executed by a processor, implementing a method for verifying code integrity on a client, the method comprising:
  determining a verification object on the client;
  generating a plurality of verification sequences, wherein each verification sequence comprises a memory access mode, and a verification algorithm;
  randomly selecting a verification sequence from the plurality of verification sequences, and obtaining a server verification result for the verification object based on the selected verification sequence;
  sending the selected verification sequence to the client;
  receiving a client verification result for the verification object calculated by the client based on the selected verification sequence; and
  comparing the server verification result with the client verification result to obtain a code verification result,
wherein the step of obtaining a server verification result comprises:
  determining a memory access mode, a verification algorithm, and a packaging format based on the selected verification sequence,
  reading data for the verification object from memory based on the memory access mode of the selected verification sequence;
  calculating a server verification value using the data based on the verification algorithm of the selected verification sequence; and
  packaging the server verification value based on the packaging format to obtain the server verification result,
wherein the step of reading data for the verification object from memory based on the memory access mode comprises:
  determining the verification address and the verification size for the verification object based on the memory access mode, wherein the verification address overlaps with the address of the verification object;
  determining a memory access function from a preset list of memory access functions based on the memory access mode; and
  reading data for the verification object from memory based on the verification address, the verification size, and the memory access function,
wherein the packaging format comprises an order of a plurality of data items, wherein the plurality of data items comprise a verification address, a verification size, the client verification result, the memory access mode, the verification algorithm, and the packaging format.

9. The storage medium of claim 8, wherein the method further comprises: obtaining a user identifier of the client, and wherein the step of generating a plurality of verification sequences comprises generating a plurality of verification sequences based on the obtained user identifier.

10. The storage medium of claim 8, wherein the plurality of data items comprise a superfluous data item.

11. The storage medium of claim 8, wherein the step of randomly selecting a verification sequence from the plurality of verification sequences comprises:
  generating a random number from a data item selected from a group consisting of a user identifier of a client, an MAC address of the user, an IP address of the user, a registration time of the user, and a login time of the user; and
  randomly selecting a verification sequence from the plurality of verification sequences based on the random number.

* * * * *